United States Patent
Schediwy et al.

(10) Patent No.: US 9,471,169 B2
(45) Date of Patent: Oct. 18, 2016

(54) FORCE ENHANCED INPUT DEVICE

(71) Applicant: SYNAPTICS INCORPORATED, Santa Clara, CA (US)

(72) Inventors: Richard R. Schediwy, Union City, CA (US); Oscar Ayzenberg, Cupertino, CA (US); Raymond Chin, Santa Clara, CA (US); Lin-Hsiang Hsieh, Taoyuan (TW); Robert Kin Hung Lee, San Ramon, CA (US); Chris Rehn, Taipei (TW); Joseph Kurth Reynolds, Alviso, CA (US); Yeh-Cheng Tan, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 204 days.

(21) Appl. No.: 13/900,298

(22) Filed: May 22, 2013

(65) Prior Publication Data

US 2014/0002113 A1    Jan. 2, 2014

Related U.S. Application Data

(60) Provisional application No. 61/650,295, filed on May 22, 2012, provisional application No. 61/694,700, filed on Aug. 29, 2012.

(51) Int. Cl.
*G06F 3/041* (2006.01)
*G06F 3/044* (2006.01)

(52) U.S. Cl.
CPC ............. *G06F 3/0414* (2013.01); *G06F 3/044* (2013.01)

(58) Field of Classification Search
CPC .. G01D 5/2417; G01D 5/24; G01R 27/2605; G01R 31/312; G01R 31/2648; G01R 31/265; G01R 31/2831; G01R 31/3167; G01R 31/2887; G01P 15/125; H03K 17/955; G06F 3/0414; G06F 3/0488; G06F 3/04883; G06F 3/044; G06K 9/0002; G01L 1/18; G01L 9/06; G01L 9/0098
USPC ...... 324/750.17, 754.28, 519, 661, 662, 686
See application file for complete search history.

(56) References Cited

U.S. PATENT DOCUMENTS 5,815,091 A * 9/1998 Dames et al. ........... 324/207.17
5,942,733 A * 8/1999 Allen ..................... G06F 3/044
                                                    178/18.01

(Continued)

OTHER PUBLICATIONS

The International Bureau of WIPO, International Preliminary Report on Patentability in International Application No. PCT/US2013/042291, mailed Dec. 4, 2014.

*Primary Examiner* — Melissa Koval
*Assistant Examiner* — Felicia Farrow
(74) *Attorney, Agent, or Firm* — Osha Liang LLP

(57) ABSTRACT

Methods and devices are described for operating an input device for an electronic system which includes a housing. The input device includes an input surface and a first substrate having a first plurality of sensor electrodes configured to sense input objects proximate the input surface, and a pair of force sensing electrodes on the bottom of the first substrate. The input device includes a second substrate having a planar spring plate including a perimeter region surrounding an interior region, the perimeter region including a leaf spring coupled to the housing, and a spacing layer configured to physically couple the interior region of the second substrate to the first substrate. A force applied to the input surface deflects the first substrate and the interior region relative to the perimeter region, changing a variable capacitance formed between the force sensing electrodes.

18 Claims, 10 Drawing Sheets

(56) References Cited

U.S. PATENT DOCUMENTS

| | | | |
|---|---|---|---|
| 9,041,418 B2* | 5/2015 | Hsieh | G06F 3/016 345/174 |
| 2008/0142352 A1* | 6/2008 | Wright | 324/686 |
| 2009/0243817 A1 | 10/2009 | Son et al. | |
| 2010/0253645 A1 | 10/2010 | Bolender | |
| 2011/0141053 A1 | 6/2011 | Bulea et al. | |
| 2011/0227872 A1 | 9/2011 | Huska et al. | |
| 2011/0278078 A1* | 11/2011 | Schediwy et al. | 324/661 |
| 2012/0062245 A1* | 3/2012 | Bao et al. | 324/661 |
| 2012/0120017 A1 | 5/2012 | Worfolk et al. | |
| 2012/0327025 A1 | 12/2012 | Huska et al. | |
| 2013/0068038 A1 | 3/2013 | Bolender et al. | |

* cited by examiner

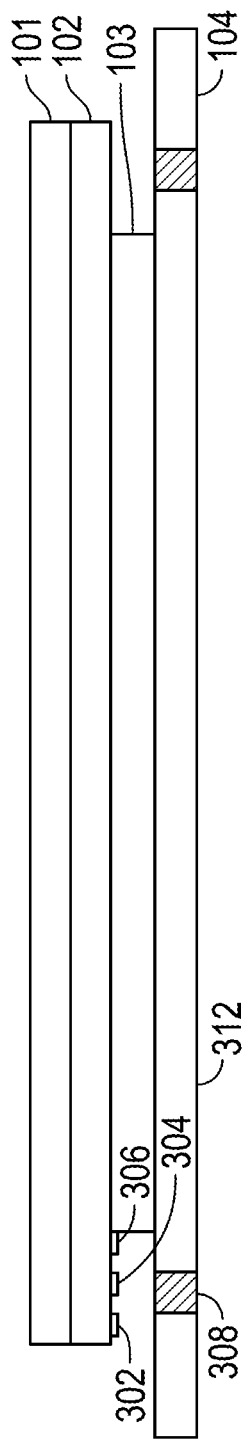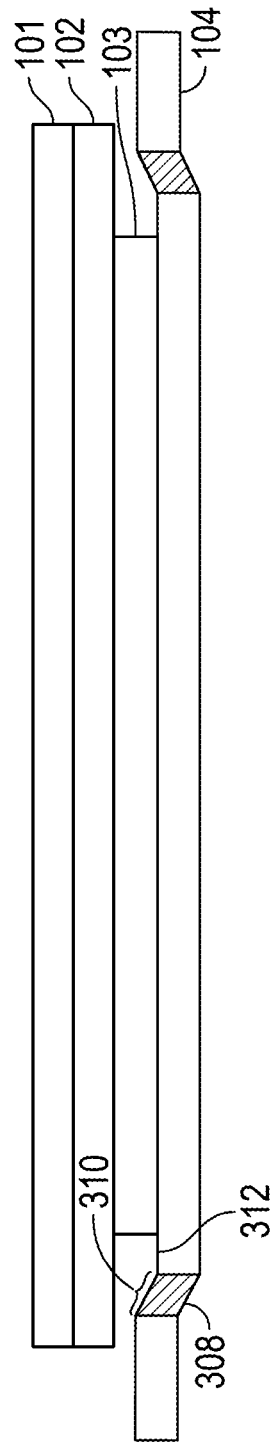

FORCE ENHANCED INPUT DEVICE

CROSS-REFERENCE TO RELATED APPLICATIONS

This application claims priority to and hereby incorporates by reference the entire contents of U.S. Provisional Patent Application 61/650,295, filed May 22, 2012 and to U.S. Provisional Patent Application 61/694,700, filed Aug. 29, 2012.

FIELD OF THE INVENTION

This invention generally relates to electronic devices, and more specifically relates to force enhanced proximity input devices for producing user interface inputs to an electronic system.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Some input devices also have the ability to detect applied force in addition to determining positional information for input objects interacting with a sensing region of the input device. However, due to questionable accuracy, presently known force sensors are limited in their ability to use force as a basis for determining user input. This limits the flexibility of the proximity sensor device to function as an input device. Thus, there exists a need for improvements in proximity sensor device, and in particular, the ability of proximity sensor devices to determine and respond to indications of applied force.

BRIEF SUMMARY OF THE INVENTION

Embodiments of the present invention provide a device and method that facilitates improved device usability. The device and method provide improved user interface functionality by strategically arranging force sensing electrodes relative to a grounded region of either a spring plate or the housing (chassis) of the electronic system within which the input device operates.

Specifically, the input device includes an input surface and a first substrate having a first plurality of sensor electrodes configured to sense input objects proximate the input surface, and at least a pair of force sensing electrodes on either the top or the bottom surface of the first substrate. The input device includes a second substrate having a planar spring plate including a perimeter region surrounding an interior region, the perimeter region including a leaf spring coupled to the housing of the electronic system, and a spacing layer configured to physically couple the interior region of the second substrate to the first substrate. A force applied to the input surface deflects the first substrate and the interior region relative to the perimeter region, changing a variable capacitance formed between the force sensing electrodes.

Other desirable features and characteristics will become apparent from the subsequent detailed description and the appended claims, taken in conjunction with the accompanying drawings and the foregoing technical field and background.

BRIEF DESCRIPTION OF DRAWINGS

The preferred exemplary embodiment of the present invention will hereinafter be described in conjunction with the appended drawings, where like designations denote like elements, and:

FIG. 3A is a cross-section view of an input device stack-up having a pair of force sensing electrodes on the bottom surface of the circuit board substrate, shown in the nominal position with no applied force in accordance with an embodiment of the invention;

FIG. 3B is a cross-section view of the input device stack-up of FIG. 3A shown in a deflected position resulting from applied force in accordance with an embodiment of the invention;

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability.

Figure 1:
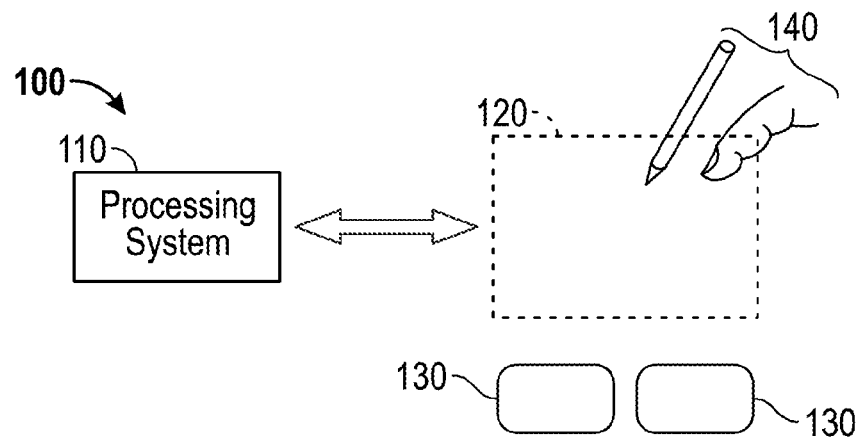
FIG. 1 is a block diagram of an exemplary electronic system that includes an input device and a processing system in accordance with an embodiment of the invention.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I$^2$C, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 may encompass any space above (e.g., hovering), around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for input objects in the sensing region. This positional information can then be used by the system to provide a wide range of user interface functionality. Furthermore, the processing system is configured to determine force information for input objects in the sensing region. This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. In various embodiments, input surfaces may be provided by surfaces of casings within which the sensor electrodes reside, by face sheets applied over the sensor electrodes or any casings.

The electronic system 100 may utilize any combination of sensor components and sensing technologies to detect user input (e.g., force, proximity) in the sensing region 120 or otherwise associated with the touchpad. The input device 102 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

The input device 100 may also utilize near-field communication components to communication with other passive or active devices. For example, the input device 100 may comprise communication elements for generating a magnetic field which may be modulated by a "target device". The target device can be a passive device which is essentially unpowered, and modulates the magnetic field generated by the input device 100. For example, tags (including various types of Radio Frequency Identification (RFID) tags), stickers, key fobs, or cards that do not require batteries. The tags can be used to securely store a variety of different types of data, such as debit and credit card information, loyalty program data, PINs and networking contacts, among other information. In other examples, the target device can be an active device which is able to generate its own magnetic field enabling communication to and from the input device 100.

In FIG. 1, a processing system 110 is shown as part of the input device 100. However, in other embodiments the processing system may be located in the host electronic device within which the input device 100 operates. The processing system 110 is configured to operate the hardware of the input device 100 to detect various inputs from the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information, particularly regarding the presence of an input object in the sensing region. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device is implemented with additional input components that are operated by the processing system or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

As will be described in greater detail below, the input device 100 can also be implemented with one or more force sensors. These force sensors can provide various types of force information, and the processing system 110 can emulate various types of user input based upon the force information. Furthermore, the processing system 110 can emulate various types of user input based upon a combination the force information and position information. The types of user input may include, but are not limited to, pointing, tapping, selecting, clicking, double clicking, panning, zooming, and scrolling. For example, the processing system may emulate a left-click if the force and/or position information meets predetermined input metrics. The input metrics may be, for example, a predetermined force range, a combination of a force range and a length of time the input object is in contact with the input surface, a combination of a force range and a position of the input objects in contact with the input surface, or a combination of a force range, a length of time, and a position of the input objects in contact with the input surface. The input metric may also depend upon the number of input objects contacting the input surface Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. For example, buttons (not shown) may be placed near the sensing region 120 and used to facilitate selection of items using the input device 100. Other types of additional input components include sliders, balls, wheels, switches, and the like. Conversely, in some embodiments, the input device 100 may be implemented with no other input components.

In some embodiments, the electronic system 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

As described above, in some embodiments some part of the electronic system processes information received from the processing system to determine input information and to act on user input, such as to facilitate a full range of actions. It should be appreciated that some uniquely input information may result in the same or different action. For example, in some embodiments, input information for an input object comprising, a force value F, a location X,Y and a time of contact T may result in a first action. While input information for an input object comprising a force value F', a location X',Y' and a time of contact T' (where the prime values are uniquely different from the non-prime values) may also result in the first action. Furthermore, input information for an input object comprising a force value F, a location X',Y and a time of contact T' may result in a first action. While the examples below describe actions which may be performed based on input information comprising a specific range of values for force, position and the like, it should be appreciated that that different input information (as described above) may result in the same action. Furthermore, the same type of user input may provide different functionality based on a component of the input information. For example, different values of F, X/Y and T may result in the same type of action (e.g. panning, zooming, etc.), that type of action may behave differently based upon said values or other values (e.g. zooming faster, panning slower, and the like).

As noted above, the embodiments of the invention can be implemented with a variety of different types and arrangements of capacitive sensor electrodes for detecting force and/or positional information. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. There are various usability differences between indirect and direct more which may confuse or prevent full operation of the input device. For example, an indirect input device may be used to position a cursor over a button by moving an input object over a proximity sensor. This is done indirectly, as the motion of the input does not overlap the response on the display. In a similar case, a direct interaction device may be used to position a cursor over a button by placing an input object directly over or onto the desired button on a touch screen.

Devices and methods are provided that facilitate improved input device performance. The devices and methods utilize a first substrate with proximity sensor electrodes and at least one pair of force sensor electrodes disposed on the first substrate. A second substrate is physically coupled to the first substrate, where the second substrate comprises an electrode region and a spring element coupling an interior and exterior region of the second substrate. The electrode region at least partially overlaps the first force sensor electrode to define a variable capacitance between the first force sensor electrode and the second substrate. The spring element is configured to facilitate deflection of the electrode region relative to the first force sensor electrode to change the variable capacitance. A measure of the variable capacitance may be calculated and used to determine force information regarding the force biasing the input device.

In another embodiment the devices and methods utilize a first force sensor electrode (comprising a transmitter force electrode) and receiver force electrode disposed on a first substrate. The electrode region of the second substrate overlaps at least a portion of the transmitter electrode and the receiver electrode to define a variable capacitance between the transmitter electrode and the receiver electrode that changes with the deflection of the second substrate.

In some embodiments the second substrate comprises a conductive layer that is patterned to define the spring element and the electrode region. In other embodiments the conductive layer may be further patterned to define an attachment component used to couple to a casing (housing) of an electronic system.

In some embodiments a processing system is communicatively coupled to the first force sensor electrode and is configured to determine a capacitance value of the variable capacitance and to determine force information from the capacitance value. In other embodiments the processing system is further communicatively coupled to the proximity sensor electrodes and is configured to determine positional information for objects that are in a sensing region using the proximity sensor electrodes. These implementations offer potential advantages of sharing components between the proximity sensor and the force sensor in the input device. Stated another way, these implementations allow force sensing to be added to a proximity sensor with relatively low additional cost and complexity.

In another embodiment a method of forming an input device is provided that comprises providing a first substrate and disposing a plurality of sensor electrodes and a first force sensor on the first substrate. A second substrate is patterned to define a spring element and an interior and exterior region, where the spring element is configured to facilitate deflection of the interior region relative to the exterior region. The second substrate is physically coupled to the first substrate such that the electrode exterior region at least partially overlaps the first force sensor electrode to define a variable capacitance between the first force sensor electrode and the electrode component. When so coupled, the deflection of the exterior region relative to the first force sensor electrode changes the variable capacitance. A measure of the variable capacitance may be calculated and used to determine force information regarding the force biasing the input device.

In another embodiment an input device is provided that comprises a plurality of proximity sensor electrodes and a first force sensor comprising a transmitter force sensor electrode and a receiver force sensor electrode, disposed on a substrate. A conductive layer is patterned to define at least one attachment component, at least one spring element, an interior and exterior region, and at least one electrode region. The patterned conductive layer is physically coupled to the first substrate such that the electrode region at least partially overlaps the first force sensor to define a variable capacitance between the force sensor electrode and the electrode region. The spring feature is configured to facilitate deflection of the electrode region relative to the force sensor electrode to change the variable capacitance. A casing is provided that comprises a mating feature which is configured to be coupled to the input device.

Various force enhanced input devices with a reduced vertical stack-up height will now be described in conjunction with FIGS. 2-10. This reduction is facilitated by integrating a stiffening layer with a spring mechanism configured to couple to the housing or chassis of an electronic system (e.g., laptop, notebook, tablet). In some embodiments, the integrated stiffener layer also includes spring elements which allow the capacitive sensor substrate to deflect relative to the electronic system chassis in response to a force applied to the input surface. The stiffener plate also includes conductive electrode regions which deflect relative to the force sensing electrodes of the capacitive sensor substrate, creating a variable capacitance used to determine the magnitude of the applied force.

Figure 2:
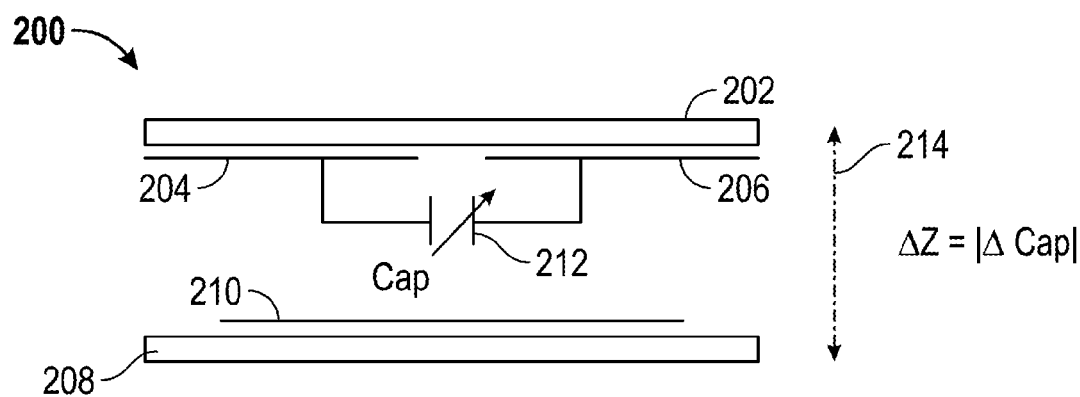
FIG. 2 is a schematic diagram showing a pair of force sensing electrodes configured to exhibit a variable capacitance as they move relative to an opposing grounded surface in accordance with an embodiment of the invention.

FIG. 2 is a schematic diagram 200 of a pair of force sensing electrodes 204 and 206 configured to exhibit a variable capacitance 212 as the force sensing electrodes move in the Z direction 214 relative to a conductive region 210 of an opposing surface 208. In one embodiment, force sensing electrode 204 is a transmitter electrode and force sensing electrode 206 is a receiver electrode, although other embodiments are contemplated.

FIGS. 3A and 3B are cross-section views of an input device stack-up having a pair of force sensing electrodes analogous to the force sensing electrodes shown in FIG. 2. FIGS. 3A and 3B illustrate the non-deflected and deflected states, respectively, of the input device. The input device includes a cover layer 101, a first substrate 102, a coupling (e.g., adhesive) layer 103, and a second substrate 104. The first substrate 102 is also referred to herein as the circuit board layer, and may be a printed circuit board (PCB), for example, a glass-reinforced epoxy laminate sheet such as an FR4 board, or a polyethylene terephthalate (PET) film. Second substrate 104 includes a perimeter region 308, a spring mechanism 310, and an interior region 312. In the illustrated embodiment, first substrate 102 is physically coupled to the interior region 312 of the second substrate 104 via the coupling layer 103. First substrate 102 includes at least one pair of force sensing electrodes on its bottom surface, as described in greater detail below.

With continued reference to FIGS. 3A and 3B, the at least one pair of force sensing electrodes (not shown in FIGS. 3A and 3B for clarity) may be disposed on the bottom side of the first substrate 102 in one or more of the following locations: i) at a first position 306 opposing the interior 312 of the second substrate 104; ii) at a second position 304 opposing the return mechanism of the second substrate 104; and iii) at a third position 302 opposing the perimeter 308 of the second substrate 104. When a force is imparted onto the input surface of the input device, the force sensing electrode(s) on the first substrate 102 deflect relative to the second substrate. A measurement of the variable capacitance (transcapacitance) between the pair of force sensing electrodes can be used to determine force information for one or multiple objects interacting with the input surface. Alternatively, an absolute variable capacitance may be measured between the second substrate and either one or both of the force sensing electrodes.

Figure 4:
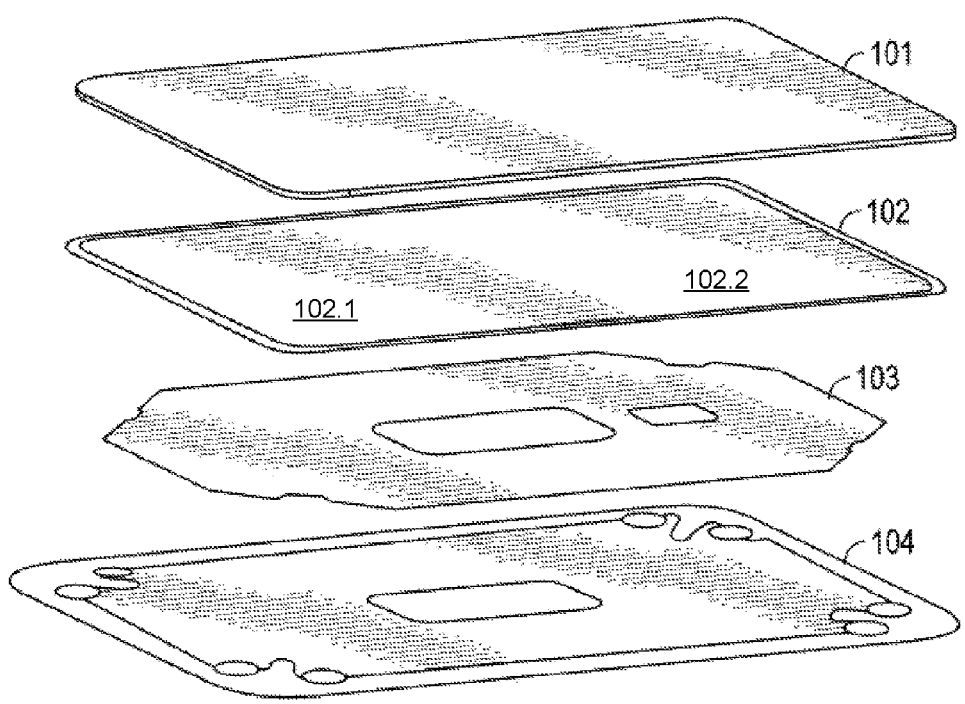
FIG. 4 is an exploded view of the stack-up shown in FIGS. 3A and 3B in accordance with an embodiment of the invention.

FIG. 4 is an exploded view of the stack-up shown in FIGS. 3A and 3B, showing the cover layer 101, the first substrate 102 including a conductive coil 102.1, a plurality of proximity sensor electrodes 102.2 and at least one pair of force sensing electrodes (also not shown in FIG. 4 for clarity. The first substrate 102 may comprise multiple individual layers of proximity sensor electrodes 102.2 and sensor substrate(s). In some embodiments, layers of FR4 with copper proximity/force sensor electrodes may be used. In other embodiments, glass, PET, polyimide, etc., may be used as the sensor substrate(s) with metal or ITO (and other conductive materials) used to form the proximity/force sensor electrodes.

The first substrate 102 is coupled, typically using an adhesive, to the interior region of the second substrate 104. In some embodiments, the second substrate 104 is referred to as the "stiffener layer" such that the second substrate is configured to provide increased rigidity to the first substrate and the input device. The coupling layer 103 has a thickness which provides a spacing between the second substrate 104 and any force sensor electrodes disposed on the bottom surface of the first substrate 102. In some embodiments, the coupling layer 103 may be referred to as the "spacing layer". In some embodiments, the coupling layer 103 is patterned to not overlap the force sensor electrodes on the first substrate and may comprise a layer of weld/solder, an adhesive, PSEA, tape, on one or multiple substrates, etc. In some embodiments the coupling layer 103 is disposed on the interior surface of the second substrate 104 and provides the maximum separation between the force sensor electrodes and the second substrate.

The exterior region (also referred to herein as the perimeter region) of the second substrate 104 is configured to physically couple with the chassis or housing of an electronic system within which the input device operates. In such an embodiment, a force applied to the input device causes at least a portion of the first substrate 102 to deflect relative to the second substrate 104. Since the second substrate 104 at least partially overlaps the force sensor electrode(s), a variable capacitance is defined between the force sensor electrode(s) and the second substrate 104. As discussed above, a measure of the variable capacitance may be calculated and used to determine force information regarding the force biasing the input device.

Figure 5:
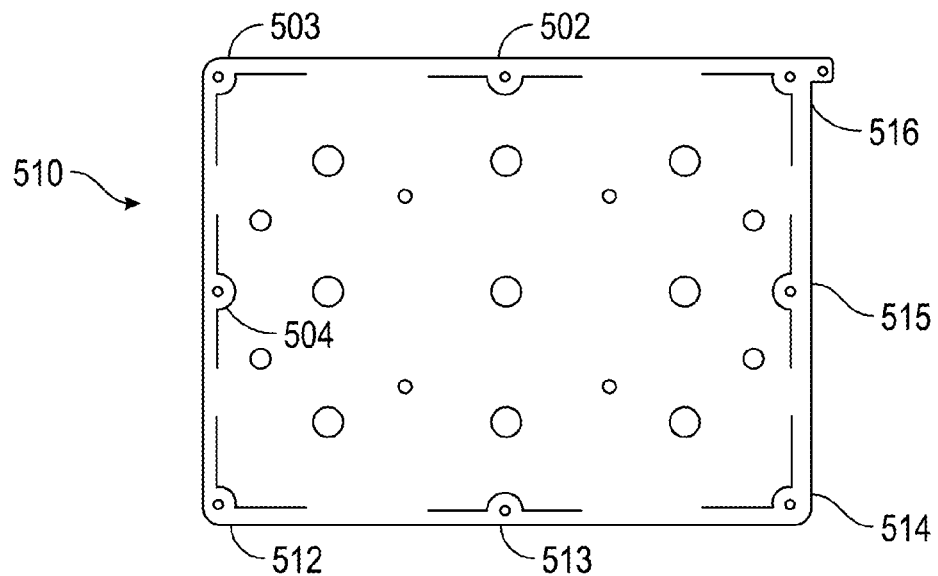
FIG. 5 is a top plan view of an exemplary spring plate having a single cantilever return mechanism in accordance with an embodiment of the invention.
Figure 6:
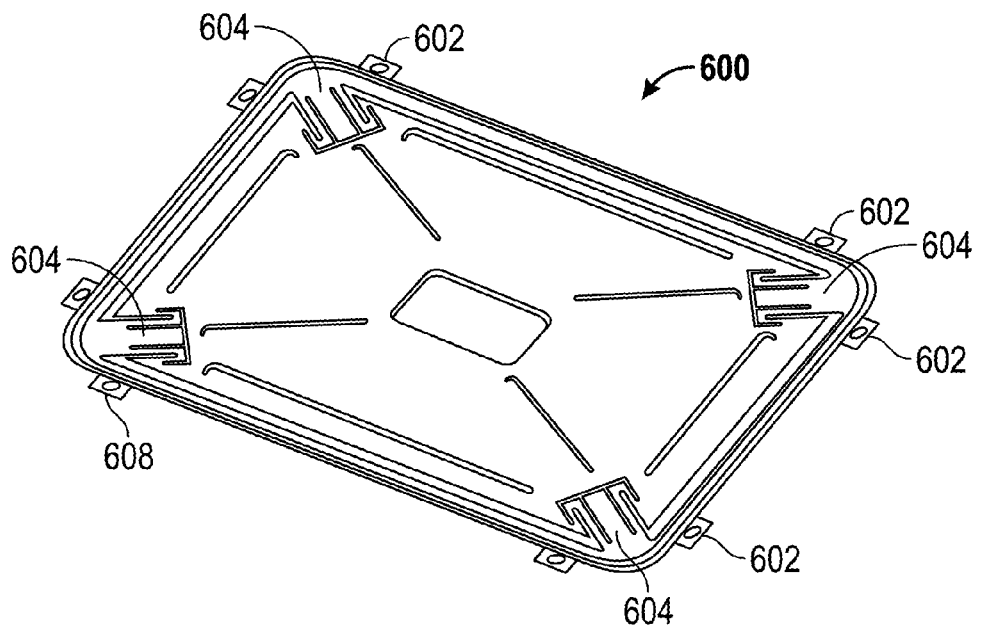
FIG. 6 is a perspective view of an exemplary spring plate having a double folded cantilever return mechanism in accordance with an embodiment of the invention.
Figure 7:
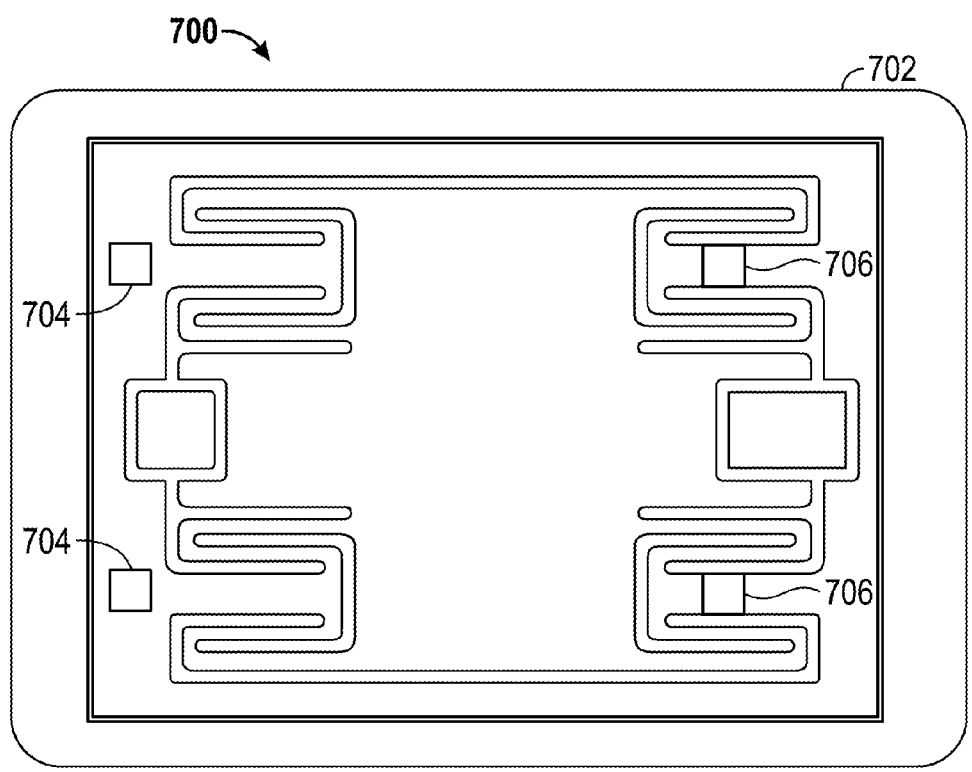
FIG. 7 is a top plan view of an exemplary spring plate having a multiple folded cantilever return mechanism in accordance with an alternate embodiment of the invention.

In one embodiment, the second substrate 104 comprises electrode regions which at least partially overlap the force sensor electrodes disposed on the first substrate 102. The second substrate 104 further comprises spring elements which are configured to allow repeatable deflection of the interior region with respect to the exterior region. FIGS. 5-7 illustrate various embodiments of the spring regions and electrode regions of the second substrate 104.

In some embodiments the cover layer 101 is part of the first substrate 102. In other embodiments, the cover layer can provide additional rigidity to the input device. For example, a glass or ceramic cover layer may be configured to provide increased rigidity to the input device. For example, a glass or ceramic cover layer may be used to "stiffen" the complete assembly. Furthermore, the cover layer may comprise various tactile and visual properties for a pleasing interaction for the user. In one embodiment, the cover layer 101 comprises a glass substrate and a face sheet made from hardened PET or polycarbonate FIG. 5 is a top plan view of an exemplary spring plate 510 having a single cantilever return mechanism. More particularly, spring plate 510 includes leaf springs 502, 503, 504, 512, 513, 514, 515, 516, integrated into the perimeter of the spring plate. The perimeter and the integral leaf springs are together referred to as the return mechanism. Holes associated with each leaf spring are used to rigidly mount the spring plate to the electronic system housing. In this way, the interior portion of the spring plate (surrounded by the perimeter portion) may deflect up and down with respect to the perimeter portion in response to applied force, which may be determined based on a variable capacitance of the force sensors.

The interior region of the spring plate, to which the sensor board (first substrate 102) is mounted, is coplanar with the perimeter of the spring plate in the absence of applied force (See FIG. 3A). In response to applied force (FIG. 3B), the interior region deflects downwardly relative to the fixed perimeter. When the force ceases, the perimeter and interior regions resume their coplanar orientation.

FIG. 6 is a perspective view of an exemplary spring plate 600 having a double folded cantilever return mechanism. More particularly, the perimeter region of the second substrate 104 includes attachment elements, 602 on each side and/or corner configured to physically couple the spring plate to a casing of an electronic system. For example, the exterior region of the stiffener layer (spring plate) may be physically coupled with screws, rivets, in-molding, or the like to an underside of a palm rest of a laptop computer. In one embodiment, the spring plate 600 is made from one integrated piece of material and the interior region is configured to deflect with respect to the exterior region. This may be accomplished by creating integrated springs between the interior and exterior regions, such as the spring elements 604 at the four corners of the spring plate. The spring elements (of which there may be various numbers of, and of various design configurations) may be configured to have a desired force-displacement function and maximum displacement distance. For example, three, four, six, eight, or more leaf or other springs may be used. The springs can be single cantilevers as shown in FIG. 5, double folded cantilevers as shown in FIG. 6, or multiple folded cantilevers (as shown in FIG. 7).

With continued reference to FIG. 6, one or more grounded regions (also referred to herein as electrode regions) are located proximate to one or more of the springs. These electrode regions correspond to the locations 308, 310, and 312 described above in connection with FIG. 3B. Each electrode region is configured to deflect relative to a corresponding force sensing electrode(s) disposed on the first substrate, which the electrode regions at least partially overlap. The overlapping arrangement of the force sensing electrode(s) and electrode regions forms the variable capacitance. Measurement of the variable capacitance, as a result of the deflection between the force sensing electrode(s) and the electrode regions can be used to determine force information for multiple objects on the input surface.

The spring plate may also include reinforcing structural elements in the interior region. The structural elements are configured to provide structural rigidity to the second substrate and thus to the assembled input device.

FIG. 7 is a top plan view of an exemplary spring plate 700 having a multiple folded cantilever return mechanism 702 at each corner. Spring plate 700 illustrates alternate ground electrode placement positions, namely, a perimeter placement position 704, and an intermediate position 706 proximate the spring mechanism.

A variety of spring element configurations, along with corresponding locations of the force sensing electrode(s) on the first substrate may be used to provide different electrical interactions between the electrode regions of the second substrate and the force sensing electrodes(s) disposed on the first substrate 102. Similarly, a variety of spring element configurations and patterning of the interior and exterior regions of the second substrate 104 which are at least partially connected by the spring elements may be used to provide different physical interaction between the first and second substrates 102 and 104.

For example, in one arrangement (analogous to the arrangement of force sensing electrodes corresponding to electrode region 704), a displacement of the interior region of X millimeters results in a substantially equal displacement of X millimeters between the electrode regions and the force sensing electrodes. In another arrangement (analogous to the arrangement of force sensing electrodes corresponding electrode region 706), a displacement of the interior region of X millimeters results in a displacement of Y millimeters between the force sensing electrode(s) and the electrode regions overlapped on the second substrate (wherein: $Y=(\frac{1}{2})$ X; $Y=(\frac{1}{3})$ X; $Y=(\frac{1}{4})$ X; and the like). A variety of different configurations of the spring elements along with different locations of the force sensing electrode(s) enables a flexible design, where a deflection of the interior region with respect to the exterior region and the electrode elements may be the same or different. Thus, various arrangements can be ideally suited to the physical properties and requirements of the electronic system (e.g. maximum displacement, force required for displacement) while also allowing for an appropriate variable capacitance to be measured.

Figure 8:
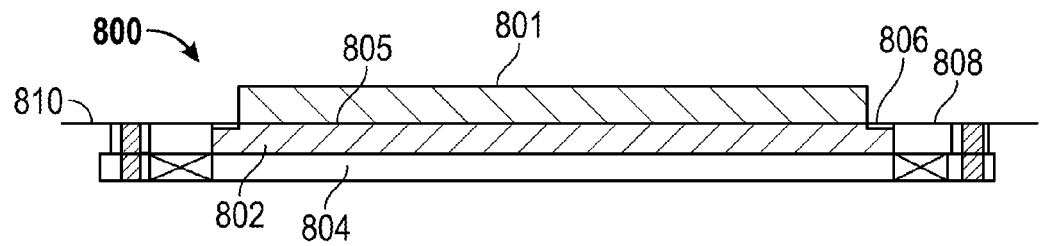
FIG. 8 is a cross-section view of an input device stack-up having a pair of force sensing electrodes on the top surface of the circuit board substrate, shown in the nominal position with no applied force in accordance with an embodiment of the invention.

FIG. 8 is a cross-section view of an alternate configuration of an input device stack-up 800 including a cover layer 801, a circuit board substrate 802, and a spring plate 804, shown in the nominal position with no applied force. The stack-up 800 is shown installed in a chassis or housing 810 of an electronic system, the underside surface of which is designated as surface element 808. The circuit board substrate 802 includes a pair of force sensing electrodes 806 on a top surface 805 of the circuit board substrate 802. A grounded region of the surface 808 is disposed opposite to the force sensing electrodes 806 to form a variable capacitance therewith. The grounded region of surface element 808 may be made from any suitable conductive material, for example, a metallic insert or a conductive film, paint, or the like.

As a result of force applied to the input surface (cover layer) 801, the interior region of the spring plate, to which the circuit board substrate 802 is attached, deflects downwardly causing the force sensing electrodes 806 to deflect downwardly away from the (grounded) underside surface 808, resulting in a change in the variable capacitance associated with force sensing electrodes 806.

Figure 9:
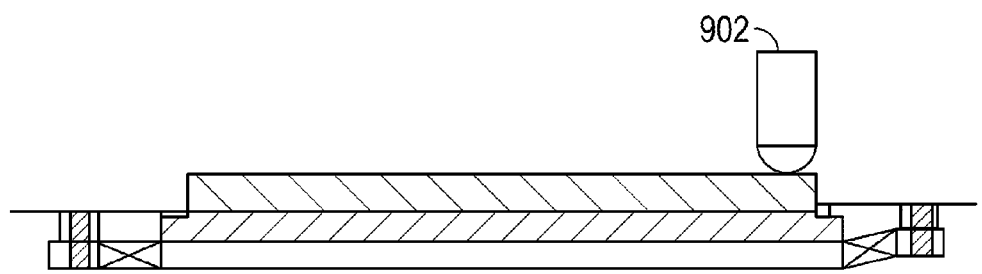
FIG. 9 is a cross-section view of the input device stack-up of FIG. 8 shown in a deflected position resulting from applied force applied near an edge of the input surface in accordance with an embodiment of the invention.
Figure 10:
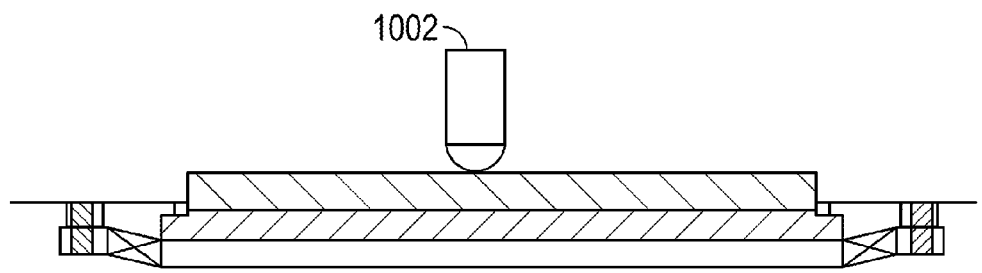
FIG. 10 is a cross-section view of the input device stack-up of FIGS. 8 an 9 shown in a deflected position resulting from applied force applied near the center of the input surface in accordance with an embodiment of the invention.

FIG. 9 is a cross-section view of the input device stack-up of FIG. 8 shown in a deflected position resulting from applied force applied near an edge of the input surface. FIG. 10 is a cross-section view of the input device stack-up of FIGS. 8 and 9 shown in a deflected position resulting from applied force applied near the center of the input surface. FIGS. 9 and 10 illustrate exemplary deflections of the first substrate (circuit board) 802 relative to the casing of the electronic system in response to a force imparted on the edge 902 (FIG. 9) and middle 1002 (FIG. 10) of the input surface, with both imparted forces illustrated as a "push down" element. A measurement of the variable capacitances formed between the force sensor electrodes 806 disposed on the first substrate 802 can be used to determine force information for objects in the sensing region causing such a "push down", including multiple objects in the sensing region. A deflection limiter (e.g. a stopper) may be employed to limit the maximum deflection of the second substrate. The deflection limiter may be part of the electronic system or the input device.

Figure 11:
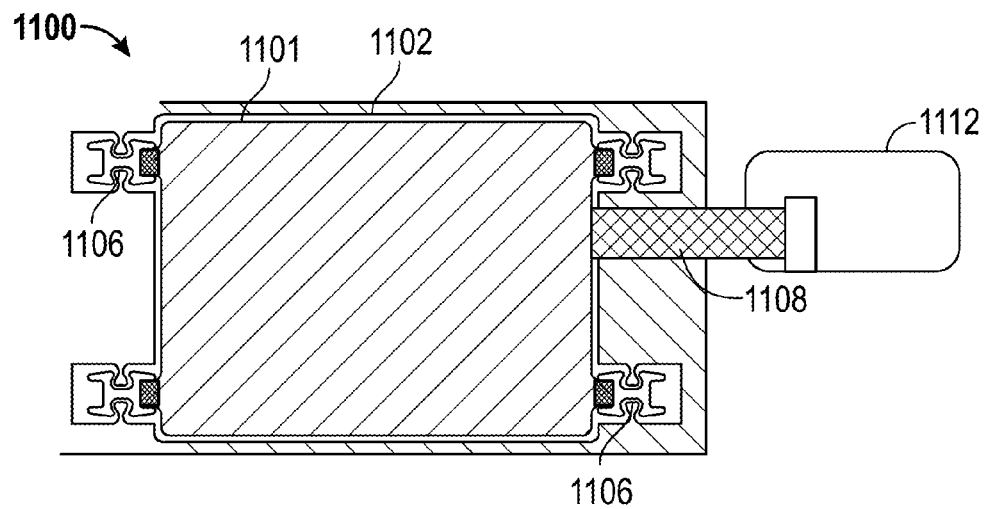
FIG. 11 is a top plan view of an input device showing a glass stiffening layer adhered to the circuit board substrate in accordance with an embodiment of the invention.

FIG. 11 is a top plan view of an input device 1100 showing a glass stiffening layer 1101 adhered to a circuit board substrate 1102. The spring elements 1106 of the second substrate partially overlap the casing of the electronic system. The glass stiffening layer 1101 is coupled to the first substrate and provides the input surface for the input device. In the illustrated embodiment, the circuit board substrate 1102 comprises a flexible circuit (e.g. PET film) on which the force sensor electrode(s) and proximity electrode(s) are disposed. Furthermore, the flexible circuit may be extended via a pin out tail 1108 to couple to a separate substrate (e.g., a daughter board 1112) to connect to processing circuitry.

In various embodiments, the input device comprises a cover layer, a first substrate (e.g., a circuit board layer), a coupling layer (e.g., adhesive), and a second substrate (e.g., a spring plate). The cover layer may comprise a glass substrate and face sheet with a combined thickness of 0.5-1.2 mm. The first substrate may comprise FR4 or polyimide having a thickness of 0.3-1.0 mm. The coupling layer may comprise an adhesive having a thickness of 0.1-0.4 mm. The second substrate may comprise an integrated conductive material having a thickness of 0.3-1.00 mm. In these various embodiments, the input device may comprise a total thickness of 1.3 mm-3.6 mm.

Figure 12:
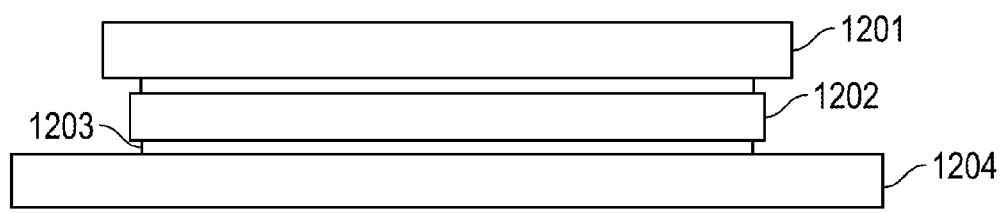
FIG. 12 is a cross-section view of an input device stack-up illustrating the use of a glass stiffener in accordance with an embodiment of the invention.

In one embodiment shown in FIG. 12, the cover layer (e.g. Glass Face Sheet) 1201 has a thickness of about 1.0 mm, the first substrate 1202 (e.g. FR4-PCB) has a thickness of about 0.5 mm, and the second substrate (e.g. spring plate) 1204 has a thickness of about 0.5 mm. The coupling layer 1203 between the second and first substrate (e.g. adhesive) has a thickness of about 0.1 mm.

Figure 13:
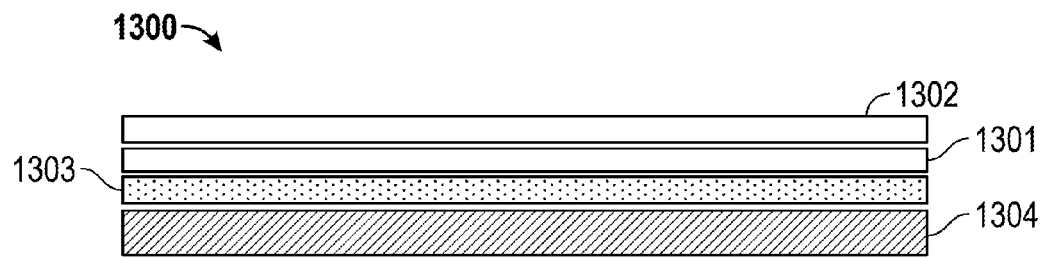
FIG. 13 is a cross-section view of an input device stack-up illustrating a ferrite layer between the first and second substrates in accordance with an embodiment of the invention.

In some embodiments, the force-enabled input device includes near-field communication components; that is, the first substrate of the input device comprises communication elements configured to communicate with other devices through magnetic induction. For example, the first substrate may comprise two loop antennas for generating a magnetic field. In such an embodiment, a conductive layer coupled to the first substrate may interfere with the magnetic field generated by the near-field communication. FIG. 13 is a cross-section view of an input device stack-up 1300 illustrating a ferrite layer between the first and second substrates. More particularly, stack-up 1300 includes a first substrate 1302, a second substrate 1304, an adhesive layer 1303 therebetween, and a ferrite layer 1301 adjacent to the first substrate. The embodiment shown in FIG. 13 uses the ferrite layer to shield the conductive layer (e.g., all or part of the second substrate) from interfering with the magnetic field.

More generally, FIG. 13 illustrates an input device comprising a ferrite layer disposed between the first and second substrates. The ferrite lay may comprise Manganese-zinc ferrite, Nickel-zinc ferrite, Strontium ferrite, Barium ferrite, Cobalt ferrite, and the like. In some embodiments the ferrite layer is disposed as part of the coupling layer which may comprise an adhesive or other materials such as plastics, etc. Similar to that of the adhesive, the ferrite layer may be disposed in the interior region of the second substrate and/or beneath the area of the near-field communication components (e.g. loop antennas) disposed on the first substrate. In some embodiments, the ferrite layer provides an additional spacing between the first and second substrate. FIG. 13 is an example of such an embodiment.

Figure 14:
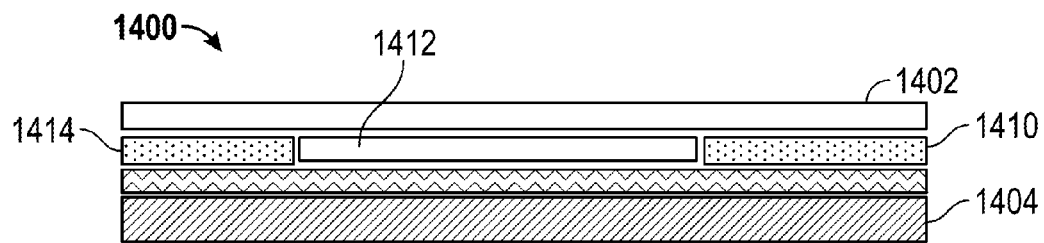
FIG. 14 is a cross-section view of an input device stack-up illustrating a localized ferrite layer between the first and second substrates in accordance with an alternate embodiment of the invention.

The ferrite layer may also comprise part of a spacing layer. In such embodiments, the ferrite layer may be integrated or be formed as part of the spacing layer, for example by removing part of the spacing layer which overlaps the near-field communication components disposed on the first substrate. FIG. 14 is an example of such an embodiment. In particular, FIG. 14 is a cross-section view of an input device stack-up 1400 illustrating a localized ferrite layer between the first and second substrates.

The first substrate of the input device of FIGS. 13 and 14 may comprise multiple individual layers of proximity sensor electrodes, near-field communication components and sensor substrate(s). In some embodiments, layers of FR4 with copper proximity/force sensor electrodes may be used. In other embodiments, glass, PET, polyimide, etc., may be used as the sensor substrate(s) with metal or ITO (and other materials) used to form the proximity/force sensor electrodes or the near field communication components.

Figure 15:
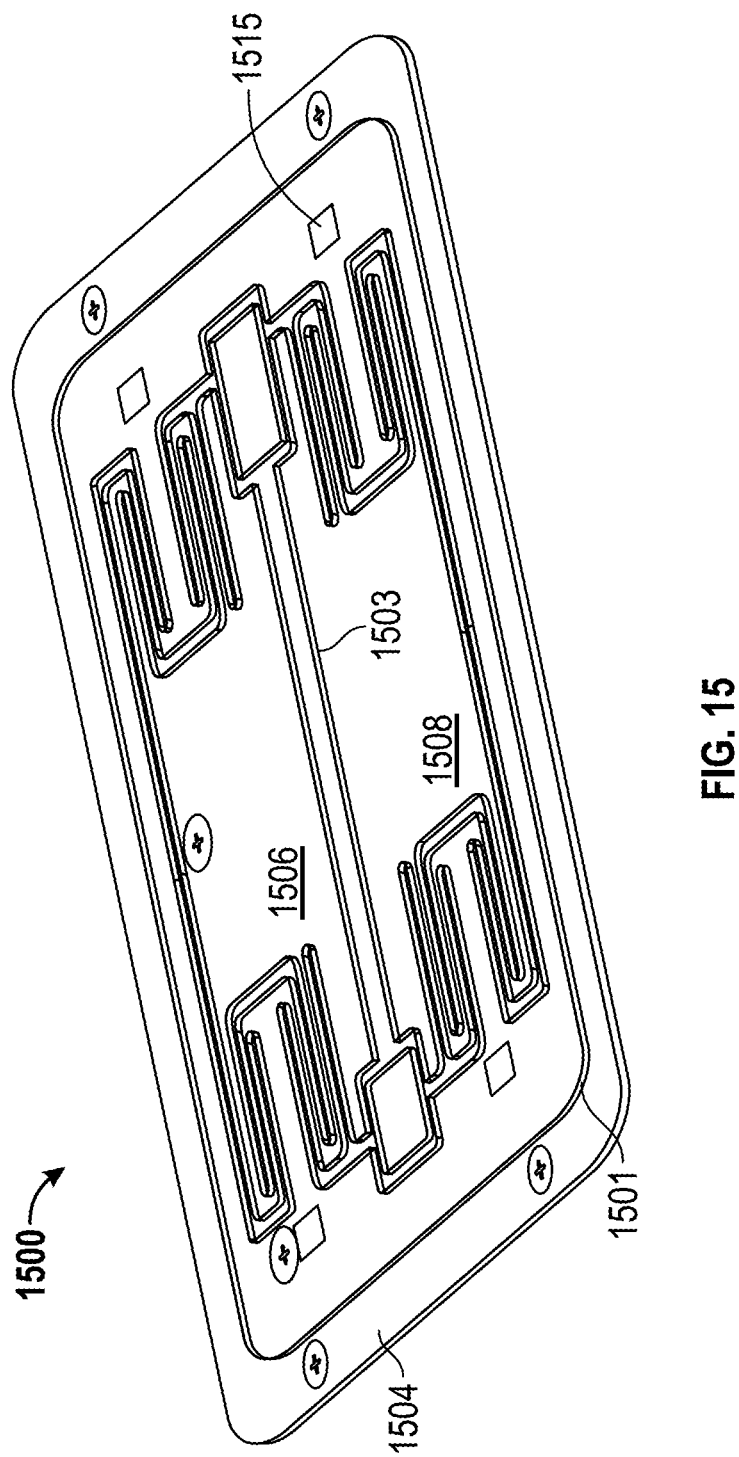
FIG. 15 is a perspective view of an alternate embodiment of a spring plate in the form of two coplanar spring plate symmetrical sections in accordance with an embodiment of the invention.

FIG. 15 is a perspective view of an alternate embodiment of an input device including a spring plate 1504 in the form of two coplanar spring plate sections 1506, 1508 separated by a distance 1503. In this way, the conductive regions 1515 of the spring plate which form part of the variable capacitance (see FIG. 2) may be isolated from the spring mechanism, while also yielding sufficient travel in the Z direction (resulting from applied force) to measure a robust variable capacitance.

In the context of various embodiments described herein, it is desirable that the input devices exhibit a high degree of stiffness. In this regard, glass has been used to provide stiffening. However, it can be quite expensive to provide glass with appropriate texturing and coloring for use as a touch surface. Accordingly, in an embodiment, a non-cosmetic glass is used to provide stiffening, coupled with a relatively inexpensive facesheet (e.g., PET/polycarbonate film) for cosmetic purposes.

Figure 16:
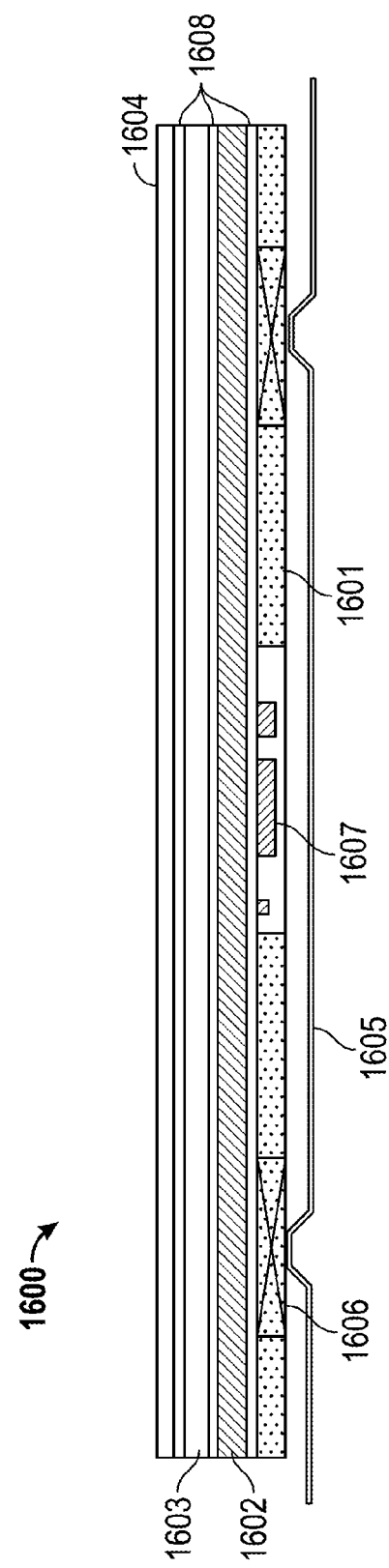
FIG. 16 is a cross-section view of an input device stack-up illustrating the use of a glass stiffener and a cosmetic facesheet in accordance with an embodiment of the invention.

FIG. 16 is a cross-section view of an input device stack-up 1600 illustrating the use of a glass stiffener and a cosmetic facesheet. More particularly, stack-up 1600 includes a base plate 1605 (which may be omitted if desired), a spring plate 1601, a printed circuit board (PCB) or flexible printed circuit board (FPC) layer 1602, a glass stiffener plate 1603, and a cosmetic facesheet (e.g., mylar or a suitable cosmetic film) 1604. Respective adhesive layers 1608 may be used to adhere the various layers together.

Those skilled in the art should appreciate that stack-up 1600 is primarily intended to illustrate the relative arrangement of the above components. In order to also accommodate the various force sensing techniques discussed above, it may be desirable to either: ii) extend spring plate 1601 (and preferably a return mechanism 1606 associated therewith) to the left or to the right in the figure; or ii) shorten the left-to-right dimension of the circuit board layer 1602 relative to the spring plate 1602 to thereby facilitate displacement of the circuit bord with respect to the perimeter of the spring plate responsive to applied force.

An input device is thus provided for an electronic system having a housing, the input device including an input surface and a first substrate including: a first plurality of sensor electrodes configured to sense input objects proximate the input surface; and at least one pair of force sensing electrodes disposed on the bottom side of the first substrate. The input device further includes a second substrate having a planar spring plate including a perimeter region surrounding an interior region, the perimeter region including a return mechanism configured to be physically coupled to the housing, and a spacing layer disposed between and configured to physically couple the interior region of the second substrate and the first substrate, wherein a force applied to the input surface results in a deflection of the first substrate and the interior region of the second substrate relative to the perimeter region if the second substrate, changing a variable capacitance formed between the at least one pair of force sensing electrodes.

In an embodiment, the second substrate includes at least one conductive region, wherein the variable capacitance is formed between the at least one conductive region and the pair of force sensing electrodes. The at least one conductive region may be disposed on the perimeter if the spring plate or on the return mechanism of the spring plate.

In accordance with various embodiments, the planar spring plate may be in the form of a continuous sheet of metal, and the return mechanism may be in the form of a plurality of leaf springs, wherein each of the plurality of leaf springs may comprise a single fold cantilever design or a multiple folded cantilever design.

In an embodiment, the second substrate is substantially rectangular and the return mechanism comprises four planar leaf springs disposed on four corners of the second substrate, respectively. Moreover, the first may include a microelectronic component and the spacing layer may include an aperture substantially aligned with the microelectronic component.

In an embodiment, the spacer layer comprises a conductive via configured to ohmically couple the at least one conductive portion of second substrate to a conductive portion of the first substrate.

In a further embodiment, the at least one pair of force sensing electrodes comprises a first force sensing electrode configured to transmit a sensing signal and a second force sensing electrode configured to receive a resulting signal, wherein the variable capacitance comprises a transcapacitive coupling between the first and second force sensor electrode.

In another embodiment, the input surface is glass, and the first substrate comprises one of a printed circuit board (PCB) and a polyethylene terephthalate (PET) film.

In another embodiment, the input device further includes a third substrate coplanar with the second substrate, the third substrate also comprising a planar spring plate including a perimeter region surrounding an interior region, the third substrate also physically coupled to the first substrate; wherein the second and third substrates are configured such that a force applied to the input surface results in a deflection of respective interior regions of the second and third substrates relative to respective perimeter regions of the second and third substrates to thereby change a first variable capacitance formed between the second substrate and a first pair of force sensing electrodes, and a second variable capacitance formed between the third substrate and a second pair of force sensing electrodes.

In yet a further embodiment, the first substrate comprises a conductive coil configured for near-field communication, and a ferrite material is disposed between the first substrate and the second substrate which substantially overlaps the conductive coil.

In another embodiment, a processing system is communicatively coupled to and configured to operate the first plurality of sensor electrodes to determine positional information for input objects proximate the input surface. The processing system is further configured to operate the at least one pair of force sensing electrodes to determine force information for the input objects based on a change in the variable capacitance.

The processing system may also be configured to determine respective individual forces applied by multiple objects to the input surface based on the positional information and the force information.

In another embodiment, the input surface comprises an untreated glass stiffener layer overlaid with a cosmetic mylar face sheet.

An input device is provided for an electronic system having a housing, the input device comprising an input surface and a first substrate including: a first plurality of sensor electrodes configured to sense input objects proximate the input surface; and at least one force sensing electrode disposed on the top surface of the first substrate. The input device also includes a second substrate having a planar spring plate including a perimeter region surrounding an interior region, the interior region configured to be physically coupled to the first substrate with a spacing layer disposed between the interior region of the second substrate and the first substrate, the perimeter region including a return mechanism configured to be coupled to the housing. A force applied to the input surface results in a deflection of the interior region relative to the perimeter region to thereby change a variable capacitance formed between the at least one force sensing electrode and a conductive region of the housing.

A processing system is communicatively coupled to and configured to operate the first plurality of sensor electrodes to determine positional information for input objects proximate the input surface, the processing system further configured to operate the at least one force sensing electrode to determine force information for the input objects based on a change in the variable capacitance.

An input device is also provided for an electronic system having a housing which includes a conductive region, the input device comprising an input surface and a first substrate including: a first plurality of sensor electrodes configured to sense input objects proximate the input surface; a pair of transcapacitive force sensing electrodes disposed on the bottom side of the first substrate; and a conductive coil configured for near field communication. The input device also includes a second substrate including a planar spring plate including a perimeter region surrounding an interior region, the interior region configured to be mechanically coupled to the first substrate with a spacing layer disposed between the interior region and the first substrate, the perimeter region including a return mechanism configured to be coupled to the housing, wherein a ferrite material is disposed between the first substrate and the second substrate which substantially overlaps the conductive coil.

In an embodiment, a force applied to the input surface results in a deflection of the interior region relative to the perimeter region to thereby change a variable capacitance formed between the second substrate and the pair of transcapacitive force sensing electrodes.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for an electronic system having a housing, the input device comprising:
   an input surface;
   a first substrate including:
      a first plurality of sensor electrodes configured to sense input objects proximate the input surface; and
      at least one pair of force sensing electrodes disposed on a bottom side of the first substrate,
      wherein the at least one pair of force sensing electrodes includes a first force sensing electrode configured to transmit a sensing signal and a second force sensing electrode configured to receive a resulting signal; and
   a planar second substrate including a conductive region and a planar spring plate, the planar spring plate including a perimeter region surrounding an interior region, the perimeter region including a return mechanism configured to be physically coupled to the housing; and
   a spacing layer disposed between and configured to physically couple the interior region of the second substrate and the first substrate,
   wherein a force applied to the input surface results in a deflection of the first substrate and the interior region of the second substrate relative to the perimeter region of the second substrate,
   wherein the deflection changes a variable capacitance formed between the conductive region and the at least one pair of force sensing electrodes,
   wherein the variable capacitance includes a trans-capacitive coupling between the first force sensor electrode and the second force sensor electrode, and
   wherein the perimeter region of the second substrate is a region of the second substrate that is coupled to the housing and is restricted from relative movement with respect to the housing when the force is applied to the input surface.

2. The input device of claim 1, wherein the conductive region is in the perimeter region of the second substrate and is disposed on one of the perimeter of the spring plate and the return mechanism of the spring plate.

3. The input device of claim 1, wherein the return mechanism comprises a plurality of leaf springs.

4. The input device of claim 3, wherein each of the plurality of leaf springs comprises a single fold cantilever design.

5. The input device of claim 3, wherein each of the plurality of leaf springs comprises a multiple folded cantilever design.

6. The input device of claim 1, wherein the planar spring plate comprises a continuous sheet of metal.

7. The input device of claim 1, wherein the second substrate is substantially rectangular and the return mechanism comprises four planar leaf springs disposed on four corners of the second substrate, respectively.

8. The input device of claim 1, wherein the first substrate further includes a microelectronic component and the spacing layer includes an aperture substantially aligned with the microelectronic component.

9. The input device of claim 1, wherein the spacer layer comprises a conductive via configured to ohmically couple the at least one conductive portion of the second substrate to a conductive portion of the first substrate.

10. The input device of claim 1, wherein the input surface is glass, and the first substrate comprises one of a printed circuit board (PCB) and a polyethylene terephthalate (PET) film.

11. The input device of claim 1,
wherein the second substrate is configured such that a force applied to the input surface results in a deflection of the interior region of the second substrate relative to respective perimeter region of the second substrate to thereby change a variable capacitance formed between the second substrate and a first pair of force sensing electrodes.

12. The input device of claim 1, wherein the first substrate further comprises a conductive coil configured for near-field communication, and wherein a ferrite material is disposed between the first substrate and the second substrate which substantially overlaps the conductive coil.

13. The input device of claim 1, further comprising a processing system communicatively coupled to and configured to operate the first plurality of sensor electrodes to determine positional information for input objects proximate the input surface, the processing system further configured to operate the at least one pair of force sensing electrodes to determine force information for the input objects based on the variable capacitance.

14. The input device of claim 13, wherein the processing system is further configured to determine respective individual forces applied by multiple objects to the input surface based on the positional information and the force information.

15. The input device of claim 1, wherein the input surface comprises an untreated glass stiffener layer overlaid with a cosmetic mylar face sheet.

16. An input device for an electronic system, the input device comprising:
an input surface;
a housing including a conductive region;
a first substrate including:
a first plurality of sensor electrodes configured to sense input objects proximate the input surface; and
at least one force sensing electrode disposed on a top surface of the first substrate,
wherein the at least one pair of force sensing electrodes includes a first force sensing electrode configured to transmit a sensing signal and a second force sensing electrode configured to receive a resulting signal; and
a planar second substrate including a planar spring plate including a perimeter region surrounding an interior region, the interior region configured to be physically coupled to the first substrate with a spacing layer disposed between the interior region of the second substrate and the first substrate, the perimeter region including a return mechanism configured to be coupled to the housing,
wherein a force applied to the input surface results in a deflection of the interior region relative to the perimeter region,
wherein the deflection changes a variable capacitance formed between the conductive region and the at least one force sensing electrode and a conductive region of the housing,
wherein the variable capacitance includes a trans-capacitive coupling between the first force sensor electrode and the second force sensor electrode, and
wherein the perimeter region of the second substrate is a region of the second substrate that is coupled to the housing and is restricted from relative movement with respect to the housing when the force is applied to the input surface.

17. The input device of claim 16, further comprising a processing system communicatively coupled to and configured to operate the first plurality of sensor electrodes to determine positional information for the input objects proximate the input surface, the processing system further configured to operate the at least one force sensing electrode to determine force information for the input objects based on a change in the variable capacitance.

18. An input device for an electronic system having a housing which includes a conductive region, the input device comprising:
an input surface;
a first substrate including:
a first plurality of sensor electrodes configured to sense input objects proximate the input surface;
a pair of transcapacitive force sensing electrodes disposed on the bottom side of the first substrate,
wherein the pair of transcapacitive force sensing electrodes includes a first force sensing electrode configured to transmit a sensing signal and a second force sensing electrode configured to receive a resulting signal; and
a conductive coil configured for near field communication; and
a planar second substrate including a conductive region and a planar spring plate, the planar spring plate including a perimeter region surrounding an interior region, the interior region configured to be mechanically coupled to the first substrate with a spacing layer disposed between the interior region and the first substrate, the perimeter region including a return mechanism configured to be coupled to the housing, wherein a ferrite material is disposed between the first substrate and the second substrate which substantially overlaps the conductive coil,
wherein a force applied to the input surface results in a deflection of the interior region relative to the perimeter region,
wherein the deflection changes a variable capacitance formed between the conductive region and the pair of transcapacitive force sensing electrodes,
wherein the variable capacitance includes a trans-capacitive coupling between the first force sensing electrode and the second force sensing electrode, and
wherein the perimeter region of the second substrate is a region of the second substrate that is coupled to the housing and is restricted from relative movement with respect to the housing when the force is applied to the input surface.

* * * * *